Jan. 28, 1947.  E. C. WEISKOPF  2,415,055
ILLUMINATION DEVICE
Filed April 27, 1945  2 Sheets-Sheet 1
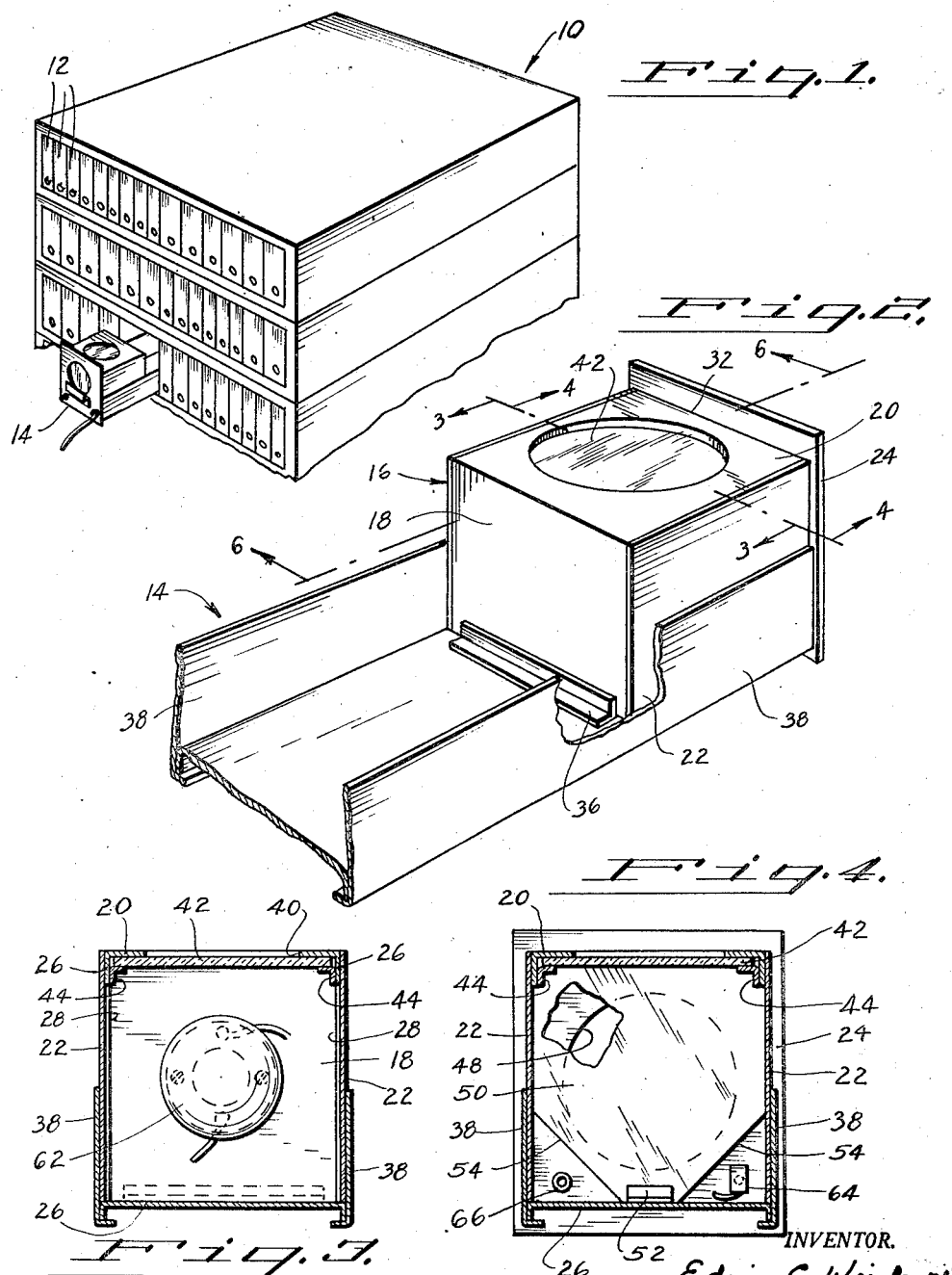
INVENTOR.
Edwin C. Weiskopf
BY
Harry Cohn
ATTORNEY.

Jan. 28, 1947.  E. C. WEISKOPF  2,415,055
ILLUMINATION DEVICE
Filed April 27, 1945  2 Sheets-Sheet 2

INVENTOR.
Edwin C. Weiskopf
BY
Harry Cohn
ATTORNEY.

Patented Jan. 28, 1947

2,415,055

UNITED STATES PATENT OFFICE 2,415,055

ILLUMINATION DEVICE

Edwin C. Weiskopf, New York, N. Y.

Application April 27, 1945, Serial No. 590,702

6 Claims. (Cl. 240—4)

This invention relates to means for illuminating projection slides or transparencies for identification purposes.

Microscopic slides, usually referred to as microslides, as well as larger slides, are customarily filed or stored in filing cabinets. A filing cabinet for those purposes is disclosed in my application, Serial No. 582,521, filed March 13, 1945. That cabinet as well as other cabinets for filing slides, for example the cabinet shown in my Patent No. 2,364,409, includes a plurality of narrow drawers for the micro-slides and also one or more drawers for wider slides or transparencies and/or for file cards. When it is desired to select a particular micro-slide or larger slide for observation or projection through a microscope or other magnifying device, it is of course necessary to identify the particular slide which is to be selected from the multiplicity of slides filed or stored in the cabinet. The present invention, pursuant to the primary object thereof, provides convenient and simple means by which the identification of the slides can be readily accomplished.

More particularly, in accordance with a preferred specific embodiment of the present invention, and pursuant to another object thereof, one of the drawers of the cabinet is provided with means for illuminating the slides so that they can be readily identified. The provision of one of the cabinet drawers with the illumination device of the present invention is highly desirable and advantageous because, among other things, the illumination device is thereby positioned for convenience in use in direct association with the cabinet which contains the slides from which the selected slides are to be removed and enables the illuminating device to be maintained in a definite location ready for use while at the same time the illumination device is covered, protected against damage and is out of the way in a safe place when not in use.

A further object of the invention is generally to provide an illumination device which is simple in construction and convenient for use in connection with micro-slides or larger slides or transparencies.

The above and other objects, features and advantages of the present invention will be fully understood from the following description considered in connection with the accompanying illustrative drawings.

In the drawings:

Fig. 1 is a perspective view of part of a filing cabinet containing a drawer provided with the illumination device of the present invention;

Fig. 2 is a fragmentary perspective view of a cabinet drawer provided with the illumination device;

Fig. 3 is a sectional view on the line 3—3 of Fig. 2;

Fig. 4 is a sectional view on the line 4—4 of Fig. 2;

Fig. 5 is a perspective view of the several parts of the illumination device in separated condition;

Fig. 6 is a separated view on the line 6—6 of Fig. 2.

Referring now to the drawings in detail, there is shown in Fig. 1 part of a filing cabinet 10 which may be of any suitable type, for example, that shown in my above mentioned application or patent. Cabinets, such as for example cabinet 10, for filing and/or storing micro-slides and other slides and/or filing cards are customarily provided with a plurality of narrow drawers 12 for the micro-slides and one or more wider drawers for wider slides or in which record cards are filed. In the cabinet constructed as shown in my above mentioned application or as in my Patent No. 2,364,409, the construction is such that a wider drawer can be disposed and fit in the space provided for a plurality of narrower drawers. Accordingly, one of the wider drawers 14 of the cabinet which is provided with the illumination device of the present invention can be mounted in any convenient part of the file cabinet.

As illustrated in Figs. 2 to 4 and 6, the illumination device of the present invention comprises a housing forming part 16 positioned in and formed by part of one of the cabinet drawers, here shown as one of the wider cabinet drawers 14. The housing is disposed at the front of the cabinet drawer thus allowing the rear portion of the latter to be used for filing purposes. The cabinet drawer and housing forming part 16 can be made of any suitable material, metallic or non-metallic, but as here shown said drawer and said housing forming part 16 are preferably formed of sheet metal, preferably sheet steel. The housing comprises a rear wall 18, a top wall 20, side walls 22 and front and bottom walls 24 and 26, respectively, constituted by the front and by a bottom portion of the cabinet drawer. As here shown, rear wall 18 and top wall 20 are integral with each other and side walls 22 are secured to the flanges 26 and 28 of top and rear walls 18, respectively, preferably by being welded thereto. The lower front edge portions 30 of side walls 22 are inclined downwardly and rearwardly to facilitate mounting of the housing unit constituted by the top wall 20, rear wall 18 and side walls 22 in drawer 14. When said unit is in the drawer, the front edge 32 of top wall 20 and the upper front edges 34 of side walls 22 abut the inner surface of the front wall 22 of the housing and drawer. The housing unit is held removably in this position in the drawer by an angle member 36 which is secured, preferably by spot welding to the bottom of the drawer and which engages the lower edge portion of rear wall 18 of the housing, and the lower portions of side walls 22 frictionally engage the adjacent inner surface portions of the adjacent sides 38, respectively, of the drawer.

The top wall 20 of the housing unit is provided with a light-outlet, and for that purpose said wall has an opening which is covered by a glass or other transparent or translucent plate 42, the latter being removably positioned immediately below and adjacent to top wall 20 and supported in that position by angle members 44 secured to the inner surfaces of flanges 26. Front wall 24 of the cabinet drawer or housing is provided with a light-outlet and for that purpose has an opening 48 which is covered by a glass or other translucent or transparent plate 50. Plate 50 is held in position abutting the inner surface of front wall 24 by an angle member 52 (Fig. 4) which is welded to bottom 26 and engages the lower edge portion of the inner surface of said plate. The lower side edge portions 54 of plate 50 are inclined downwardly and inwardly to make room adjacent the front of the housing to facilitate the insertion and removal of the housing unit 16, the latter being disposed in a rearwardly tilted position on the lower edge of rear wall 18 when being inserted in the drawer. The vertical side edges 56 of plate 50 engage the inner surface portions of side walls 22 of the housing unit, and the upper edge 58 of said plate is engaged by the forward edge portion of the inner surface of top wall 20 of the housing unit. Plates 42 and 50 can both be transparent or can both be translucent or either of said plates can be translucent or either of said plates can be transparent and the other translucent. Preferably, at least one of these plates has a ground glass finish so that it is translucent and constitutes a light transmitting ground glass screen.

The housing unit 16 is provided with means for supporting an electric lamp 60 within the housing in light-transmitting relation to both light-outlets. As here shown, the supporting means for lamp 60 comprises as electric socket 62, the base of which is secured to the rear wall 18 of the housing unit. A switch 64 is mounted in the front wall 24 and the latter is also provided with a bushing 66 for an electric cord 68.

It will be understood that in using the device when it is desired to identify the slides to be selected for observation or projection or for other purposes, the drawer of the cabinet which is provided with the illumination device of the present invention is partly withdrawn from the cabinet housing, as illustrated for example in Fig. 1, and the switch 64 is operated to light the electric lamp within the housing. More particularly, as illustrated in Fig. 1, the drawer which is provided with the illumination means is, like the other cabinet drawers, slidably mounted in the cabinet frame and is movable from a retracted position within its compartment to a projected position in which it is supported in the cabinet frame but in which the front part of the drawer projects outwardly from the front of the cabinet frame. This allows the top light-outlet of the front part of the drawer to be used. While the illumination means is shown as provided in a slidable cabinet drawer, it is within the scope of the present invention to utilize a slidable member which can be operated in the same way as a drawer but which need not have provision for holding slides or other articles. The slide to be identified can be placed over the plate 42, when the drawer or other slidable member is moved to its projected position or the slide can be placed in front of the plate 50 on a ledge hereinafter referred to whereby said slide is illuminated so that it can be identified. Usually micro-slides, being very small, are provided with identifying markings in which case said markings will be illuminated thus enabling the micro-slides to be identified. On the other hand, larger slides, for example "Kodachrome" slides, or transparencies can be identified by observing the subject matter thereof illuminated when such slide is placed in juxtaposition to the plate 42 or 50. As above indicated, one of these plates is preferably a ground glass screen which enables the subject matter of the "Kodachrome" slide or other transparency to be viewed for identification thereof. As illustrated in the drawings, the front wall 24 of the drawer, which constitutes the front wall of the housing is provided with a ledge 70 which is secured to front wall 24 preferably by being spot welded thereto. As illustrated in Fig. 6, a slide S can be supported edgewise of ledge 70 in front of plate 50 whereby said slide is illuminated for the identification thereof. It will be understood that when the light-outlet in the front end wall 24 is used, the drawer or slidable member need not be withdrawn from the cabinet frame but can remain in its retracted position in which said end wall closes the front end of the cabinet compartment in which said drawer is mounted. Thus, it is seen that the front part of slidable member 14 is provided with two light outlets, either of which may be used for identifying slides. Ordinarily the front light-outlet will be used for the micro-slides and the top light outlet will be used for the larger slides.

While I have shown and described the preferred embodiment of my invention, it will be understood that the latter may be embodied otherwise than as herein specifically illustrated or described and that in the illustrated embodiment certain changes in the details of construction and in the arrangement of parts may be made without departing from the underlying idea or principles of this invention within the scope of the appended claims.

Having thus described my invention, what I claim and desire to secure by Letters Patent is:

1. An illumination device of the character described, comprising a cabinet drawer having a bottom and a front end wall upstanding from said bottom, means including rear, top, and side walls positioned in said drawer and forming a housing with said bottom and said front end wall of the drawer, said rear, top and side walls being in fixed relation and constituting a unitary assembly, said assembly being removably secured in said drawer in said housing-forming relation with said bottom and said front of the drawer, said housing having a light-outlet opening for the passage of light from said housing to the exterior of the drawer.

2. An illumination device of the character described, comprising a cabinet drawer having a bottom and a front end wall upstanding from said bottom, means including rear, top, and side walls positioned in said drawer and forming a housing with said bottom and said front end wall of the drawer, said rear, top and side walls being in fixed relation and constituting a unitary assembly, said assembly being removably secured in said drawer in said housing-forming relation with said bottom and said front of the drawer, said front end wall of the drawer constituting the front wall of the housing and being provided with a light-outlet for the passage of light from the interior of the housing to the exterior thereof, and means in said housing for supporting a lamp in light-transmitting relation to said light-outlet.

3. An illumination device of the character described, comprising a cabinet drawer having a bottom and a front end wall upstanding from said bottom, means including rear, top, and side walls positioned in said drawer and forming a housing with said bottom and said front end wall of the drawer, said rear, top and side walls being in fixed relation and constituting a unitary assembly, said assembly being removably secured in said drawer in said housing-forming relation with said bottom and said front of the drawer, said top wall being provided with a light-outlet for the passage of light from the interior of the housing to the exterior thereof, and means in said housing for supporting a lamp in light-transmitting relation to said light-outlet.

4. An illumination device of the character described, comprising a cabinet drawer having a bottom and a front end wall upstanding from said bottom, means including rear, top, and side walls positioned in said drawer and forming a housing with said bottom and said front end wall of the drawer, said top wall being provided with a light-outlet for the passage of light from the interior of the housing to the exterior thereof, and means in said housing for supporting a lamp in light-transmitting relation to said light-outlet.

5. An illumination device of the character described adapted to be supported in a filing cabinet, said device comprising a member constructed to be slidably supported in a compartment of the cabinet and slidably movable from a retracted position in said compartment to a position in which said member projects from said compartment at the front of the cabinet, said member being provided at the front part thereof with a light-outlet, and means carried by said member for supporting a lamp in position inwardly of said front part in light-transmitting relation to said light-outlet, said last mentioned means being positioned so that it is disposed within the compartment of the cabinet when said member is in said retracted position thereof, said front part including an end wall in which said light-outlet is provided, said light-outlet including an opening in said end wall and a light-transmitting cover for said opening, said end wall providing a closure for the front of said compartment when said member is in said retracted position thereof.

6. An illumination device of the character described adapted to be supported in a filing cabinet, said device comprising a member constructed to be slidably supported in a compartment of the cabinet and slidably movable from a retracted position in said compartment to a position in which said member projects from said compartment at the front of the cabinet, said member being provided at the front part thereof with a light-outlet, and means carried by said member for supporting a lamp in position inwardly of said front part in light-transmitting relation to said light-outlet, said last mentioned means being positioned so that it is disposed within the compartment of the cabinet when said member is in said retracted position thereof, said front part including a top in which said light-outlet is provided.

EDWIN C. WEISKOPF.